United States Patent [19]

Shamie

[11] Patent Number: 5,622,377
[45] Date of Patent: Apr. 22, 1997

[54] STROLLER WITH FOLDING MECHANISM FOR FOLDING STROLLER ENTIRELY WHILE UPRIGHT

[76] Inventor: Louis Shamie, 972 Dean St., Brooklyn, N.Y. 11238

[21] Appl. No.: 465,786

[22] Filed: Jun. 6, 1995

[51] Int. Cl.$^6$ ....................................................... B62B 7/06
[52] U.S. Cl. ........................... 280/642; 280/650; 280/47.4; 297/16.2
[58] Field of Search ............................... 280/39, 641, 642, 280/644, 42, 650, 47.38, 47.4, 639, 647; 297/16.1, 16.2

[56] References Cited

U.S. PATENT DOCUMENTS

| | | | |
|---|---|---|---|
| 5,106,116 | 4/1992 | Chen | 280/642 |
| 5,181,735 | 1/1993 | Onishi | 280/642 |
| 5,205,579 | 4/1993 | Kato et al. | 280/642 |
| 5,417,450 | 5/1995 | Wang | 280/642 |
| 5,478,102 | 12/1995 | Huang | 280/642 |

*Primary Examiner*—Brian L. Johnson
*Assistant Examiner*—Michael Mar
*Attorney, Agent, or Firm*—Burgess, Ryan and Wayne

[57] ABSTRACT

A stroller includes a pair of side frames, each including a main side tube comprised of an upper and lower tube portions, a locking pivot assembly for releasably locking the lower end of the upper tube portion to the upper end of the lower tube portion such that the upper and lower tube portions are substantially in alignment with each other in an open configuration of the stroller and such that the lower end of the upper tube portion and the upper end of the lower tube portion are disengaged from each other in a configuration other than the open configuration, the releasable locking pivot assembly including a lower locking member fixed to an upper end of the lower tubular portion, and an upper locking member slidably mounted on a lower end of the upper tubular portion, a rear side tube pivotally connected to the lower tube portion, and a double pivot bar pivotally connected at one end thereof to the lower end of the upper tube portion and at an opposite end thereof to the upper end of the lower tube portion to provide a double pivoting connection therebetween, the double pivot bar is pivotally connected at the one end thereof to the lower end of the upper tube portion at a position above the upper locking member, and is pivotally connected at the opposite end thereof to the lower locking member; and cross bars for connecting together the pair of side frames.

19 Claims, 5 Drawing Sheets

STROLLER WITH FOLDING MECHANISM FOR FOLDING STROLLER ENTIRELY WHILE UPRIGHT

BACKGROUND OF THE INVENTION

The present invention relates generally to strollers, and more particularly, is directed to a stroller which folds while in an upright configuration.

Strollers are known which include a pair of spaced apart side frame halves connected to each other by rigid bars, each half having a main side tube and a rear side tube pivotally connected to the main side tube at an intermediate portion thereof. Each main side tube includes a lower tube portion that is pivotally mounted at its upper end to the lower end of an upper tube portion thereof by means of a conventional locking pivot assembly. The upper ends of the rear side tubes are pivotally connected to a lower section of the upper tube portions.

Hook shaped handles are fixed to the upper free ends of the upper tube portions. The free lower ends of the lower tube portions carry the front wheels of the stroller, while the free lower ends of the rear side tubes carry the rear wheels of the stroller.

Each locking pivot assembly locks a lower tube portion to an upper tube portion, and provides release thereof to allow the upper tube portion to pivot rearwardly with respect to the lower tube portion such that the handles fold over the rear wheels of the stroller.

The above arrangement is known, for example, from strollers sold by Century Products Co. under the mark "TRAVELITE" and those sold by Graco Products Co. under the mark "LITERIDER".

However, a problem with such strollers is that during the folding operation, there is little or no stability to the stroller, so that the stroller must be laid on the ground to completely fold the same. This is objectionable since it is more difficult to control the folding operation, and further puts a strain on a parent's back when lifting the stroller from ground level for storage.

A stroller is known from U.S. Patent No. 5,181,735 to Onishi in which handrail members are pivotally connected between the upper ends of the lower tube portions and the lower ends of the upper tube portions. However, the upper and lower tube portions are offset from each by a large distance so that no conventional locking pivot assemblies can be provided between the upper and lower tubular portions. As a result, a more complex arrangement must be provided for locking of the stroller in its open configuration.

OBJECTS AND SUMMARY OF THE INVENTION

Accordingly, it is an object of the present invention to provide a stroller that overcomes the problems with the aforementioned prior art.

It is another object of the present invention to provide a stroller that folds entirely while in an upright configuration.

It is still another object of the present invention to provide a stroller that has a double pivot point arrangement for folding.

It is yet another object of the present invention to provide a stroller having conventional locking pivot assemblies between the lower tube portions and upper tube portions of the main side tubes.

In accordance with an aspect of the present invention, a stroller includes a pair of side frames, each side frame including a main side tube comprised of an upper tube portion, and a lower tube portion, a releasable locking pivot assembly for releasably locking the lower end of the upper tube portion to the upper end of the lower tube portion such that the upper tube portion and the lower tube portion are substantially in alignment with each other in an open configuration of the stroller and such that the lower end of the upper tube portion and the upper end of the lower tube portion are disengaged from each other in a configuration other than the open configuration, a rear side tube pivotally connected to the lower tube portion, and a double pivot bar pivotally connected at one end thereof to the lower end of the upper tube portion and at an opposite end thereof to the upper end of the lower tube portion to provide a double pivoting connection therebetween; and means for connecting together the pair of side frames.

The upper and lower tube portions are parallel to each other and only slightly offset from each other in the open configuration of the stroller.

Each releasable locking pivot assembly includes a lower locking member fixed to an upper end of a respective lower tubular portion, and an upper locking member slidably mounted on a lower end of a respective upper tubular portion. The lower locking member and the upper locking member each include an opening for receiving the upper tubular portion and the lower tubular portion, respectively, in order to releasably lock the lower end of the upper tube portion to the upper end of the lower tube portion. A rod is fixed to the upper locking members and slidably secured to the upper tubular portions for slidably moving the upper locking members in a direction away from the lower locking members.

Each double pivot bar is pivotally connected at the one end thereof to the lower end of the upper tube portion at a position above the upper locking member, and is pivotally connected at the opposite end thereof to the lower locking member.

Further, each side frame further includes a first rod having first and second ends, with the first end pivotally connected to the lower tubular portion, and a second rod having first and second ends, with the first end of the second rod pivotally connected to the upper tubular portion, an intermediate point of the second rod between the first and second rods pivotally connected to the rear side tube, and the second end of the second rod pivotally connected to the second end of the first rod. The first rod has a generally horizontal orientation in the open configuration of the stroller and the second rod has a generally vertical orientation in the open configuration of the stroller.

The means for connecting includes a first cross bar connecting together the lower tubular portions, and a second cross bar connecting together the rear side tubes.

In addition, front wheels are mounted to lower ends of the lower tube portions, rear wheels are mounted to, lower ends of the rear side tubes, and a handle is mounted to upper ends of the upper tube portions, wherein the front and rear wheels are adjacent each other in a fully folded configuration of the stroller, and the handle is positioned on an opposite side of the stroller from the front and rear wheels in the fully folded configuration.

In accordance with another aspect of the present invention, a stroller includes a pair of side frames, each side frame including a main side tube comprised of an upper tube portion, and a lower tube portion, a releasable locking pivot assembly for releasably locking the lower end of the upper tube portion to the upper end of the lower tube portion such that the upper tube portion and the lower tube portion are substantially in alignment with each other in an open configuration of the stroller and such that the lower end of the upper tube portion and the upper end of the lower tube portion are disengaged from each other in a configuration other than the open configuration, the releasable locking pivot assembly including a lower locking member fixed to an upper end of the lower tubular portion, and an upper locking member slidably mounted on a lower end of the upper tubular portion, rod means fixed to the upper locking member and slidably secured to the upper tubular portion for slidably moving the upper locking member in a direction away from the lower locking member, a rear, side tube pivotally connected to the lower tube portion, and a double pivot bar pivotally connected at one end thereof to the lower end of the upper tube portion and at an opposite end thereof to the upper end of the lower tube portion to provide a double pivoting connection therebetween, the double pivot bar is pivotally connected at the one end thereof to the lower end of the upper tube portion at a position above the upper locking member, and is pivotally connected at the opposite end thereof to the lower locking member; and means for connecting together the pair of side frames.

In accordance with still another aspect of the present invention, a stroller includes a pair of side frames, each side frame including a main side tube comprised of an upper tube portion, and a lower tube portion, a releasable locking pivot assembly for releasably locking the lower end of the upper tube portion to the upper end of the lower tube portion such that the upper tube portion and the lower tube portion are parallel to each other and only slightly offset from each other in an open configuration of the stroller and such that the lower end of the upper tube portion and the upper end of the lower tube portion are disengaged from each other in a configuration other than the open configuration, the releasable locking pivot assembly including a lower locking member fixed to an upper end of the lower tubular portion, and an upper locking member slidably mounted on a lower end of the upper tubular portion, a rear side tube pivotally connected to the lower tube portion, and a double pivot bar pivotally connected at one end thereof to the lower end of the upper tube portion and at an opposite end thereof to the upper end of the lower tube portion to provide a double pivoting connection therebetween, the double pivot bar is pivotally connected at the one end thereof to the lower end of the upper tube portion at a position above the upper locking member, and is pivotally connected at the opposite end thereof to the lower locking member, a first rod having first and second ends and a generally horizontal orientation in the open configuration of the stroller, with the first end pivotally connected to the lower tubular portion, and a second rod having first and second ends and a generally vertical orientation in the open configuration of the stroller, with the first end of the second rod pivotally connected to the upper tubular portion, an intermediate point of the second rod between the first and second rods pivotally connected to the rear side tube, and the second end of the second rod pivotally connected to the second end of the first rod; and means for connecting together the pair of side frames, the means for connecting including a first cross bar connecting together the lower tubular portions, and a second cross bar connecting together the rear side tubes.

The above and other objects, features and advantages of the invention will become readily apparent from the following detailed description thereof which is to be read in connection with the accompanying drawings.

DETAILED DESCRIPTION OF A PREFERRED EMBODIMENT

Figure 1:
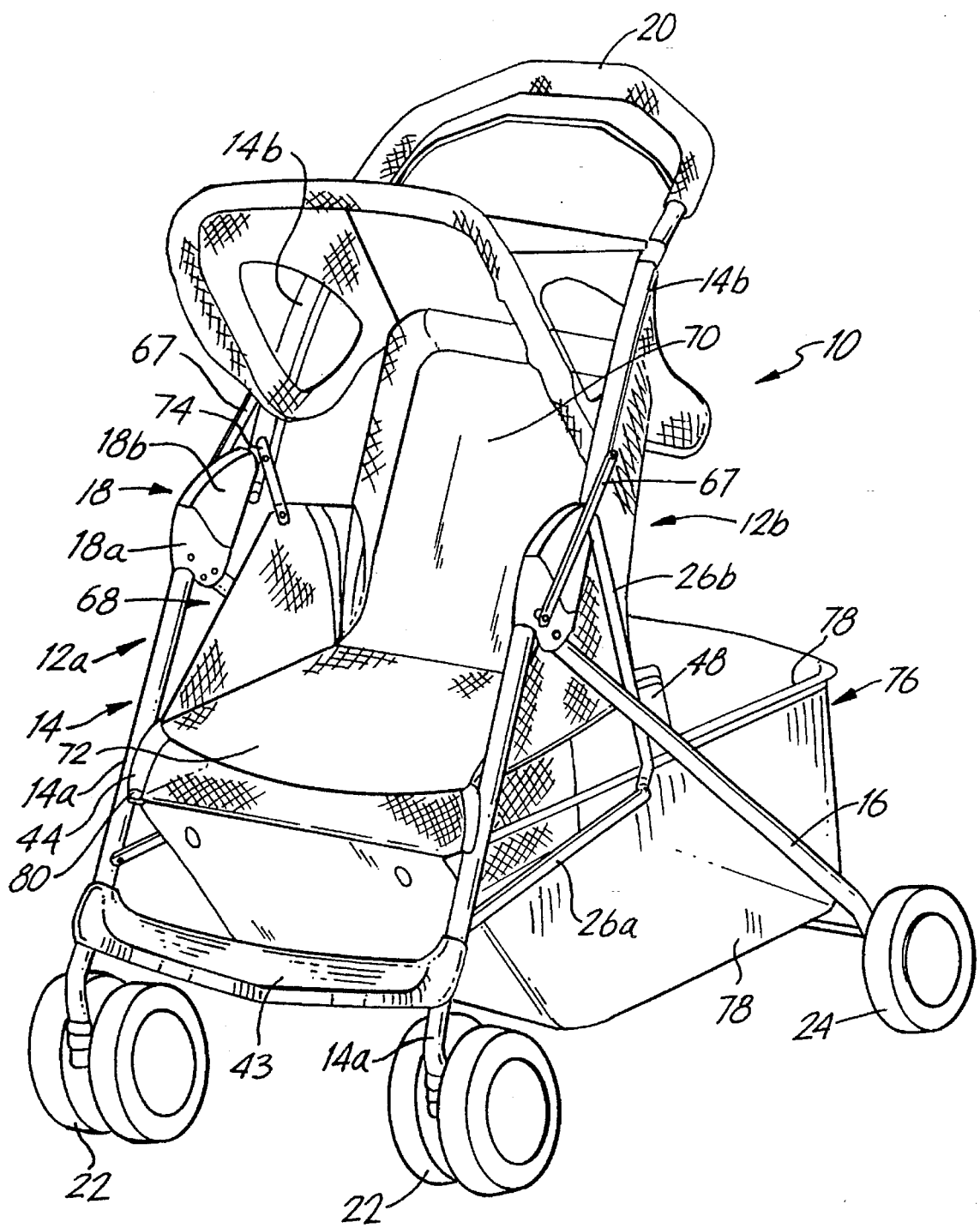
FIG. 1 is a front perspective view of the stroller according to the present invention in its fully opened configuration, viewed from the front thereof.

Referring to the drawings in detail, the present invention is directed to a stroller 10 including a pair of spaced apart side frame halves 12a and 12b, each having a main side tube 14 and a rear side tube 16 pivotally connected to main side tube 14 at an intermediate portion thereof.

Each main side tube 14 includes a lower tube portion 14a that is pivotally mounted at its upper end to the lower end of an upper tube portion 14b by means of a conventional locking pivot assembly 18.

A push bar or handle 20 is fixed to the upper free ends of upper tube portions 14b. The free lower ends of lower tube portions 14a carry the front wheels 22 of stroller 10, while the free lower ends of rear side tubes 16 carry the rear wheels 24 of stroller 10.

The upper ends of rear side tubes 16 are pivotally connected to upper ends of lower tube portions 14a, and in particular, to a portion of the locking pivot assembly 18 secured to each lower tube portion 14a.

Each locking pivot assembly 18 includes a lower locking member 18a fixed to the upper end of each lower tube portion 14a and an upper locking member 18b slidably mounted to the lower end of each upper tube portion 14b. Each upper locking member 18b is positioned in its lowest position of the respective upper tube portion 14b such that the free lower end of upper tube portion 14b extends below the upper locking member 18b by a small amount to form an engagement boss 18c which is received in a recess 18d in the respective lower locking member 18a in the open position of stroller 10 shown in FIG. 2. Each lower locking member 18a is fixed on the respective lower tube portion 14a such that the free upper end of lower tube portion 14a extends above the lower locking member 18a by a small amount to form a locking boss 18e which is received in a hole (not shown) in the respective upper locking member 18b, which is adjacent to boss 18c thereof, in the open position of stroller 10 shown in FIG. 2. Each upper locking member 18b is normally biased by an internal spring (not shown) therein to its lowered position so that it engages and locks with the respective lower locking member 18a in the open configuration of stroller 10, that is, so that bosses 18c engage within recesses 18d and so that bosses 18e lock within the respective openings of upper locking members 18b. To unlock and fold stroller 10, upper locking members 18b are slid upwardly along upper tube portions 14b to disengage with lower locking members 18a and thereby permit pivoting and folding of stroller 10.

Figure 2:
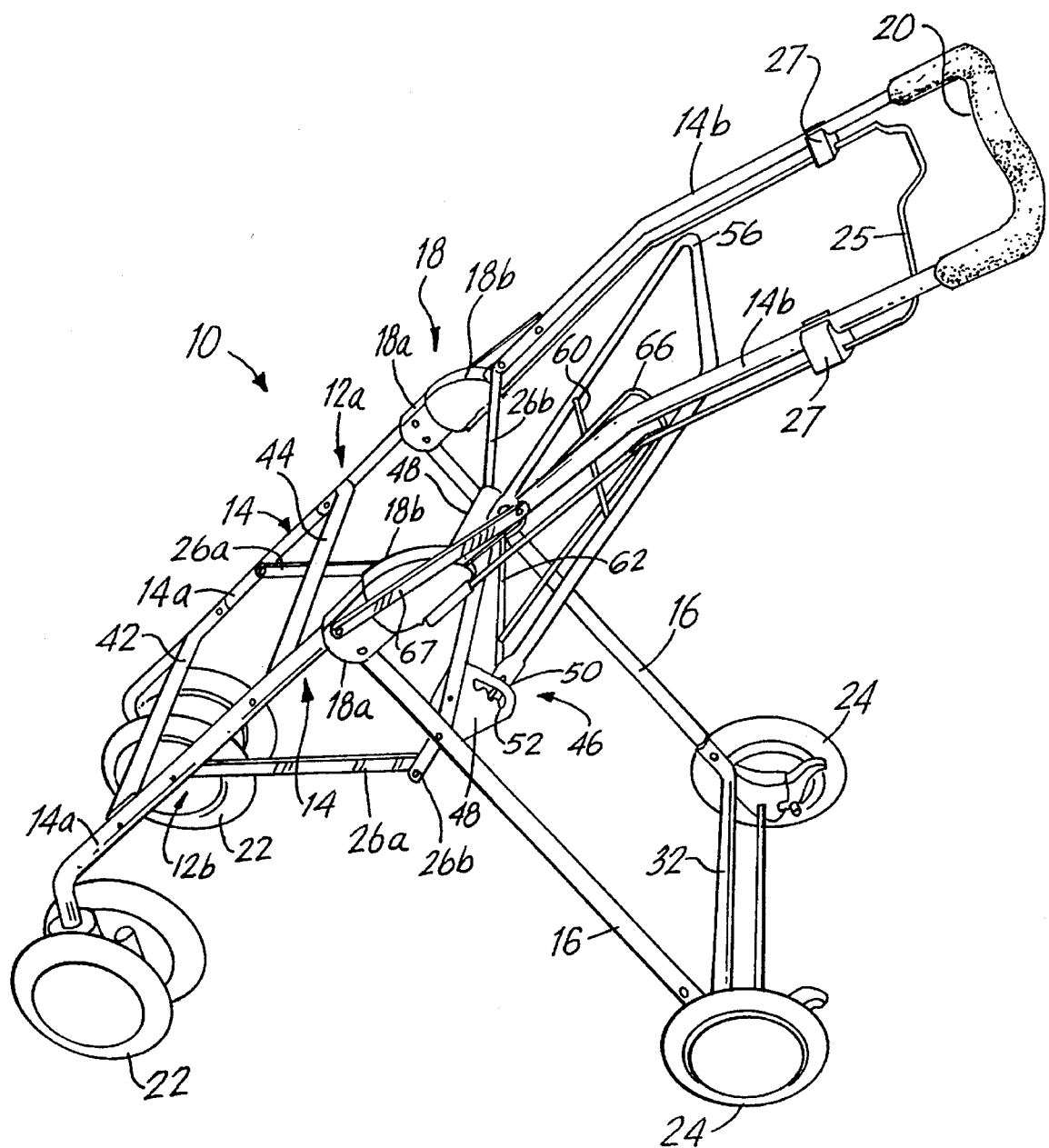
FIG. 2 is a perspective view of the frame of a stroller according to the present invention, in its fully opened configuration, viewed from a front side thereof.
Figure 3:
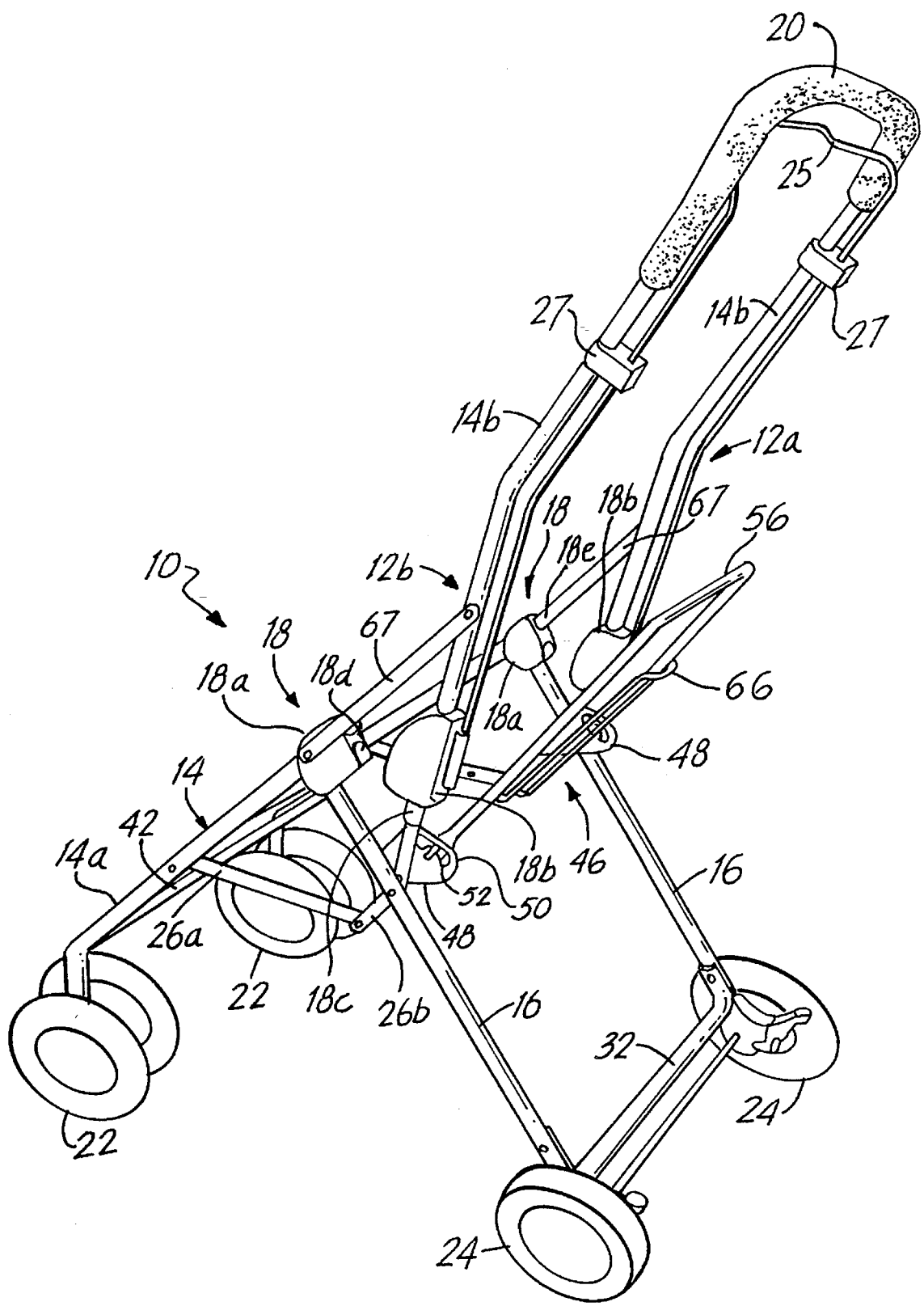
FIG. 3 is a perspective view of the frame of FIG. 2 in a first partially closed configuration, viewed from a rear side thereof.
Figure 4:
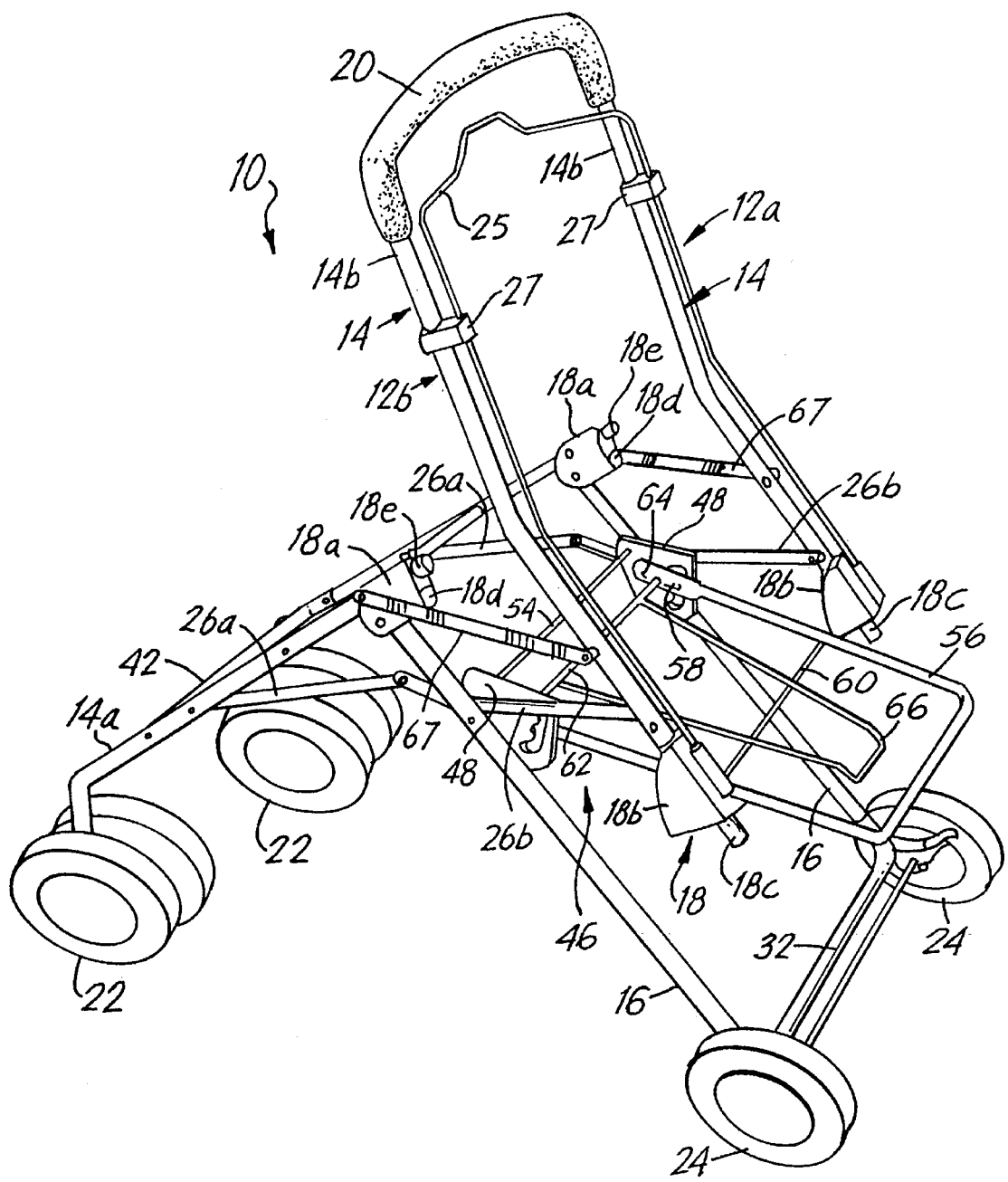
FIG. 4 is a perspective view of the frame of FIG. 2 in a second partially closed configuration, viewed from a rear side thereof.
Figure 5:
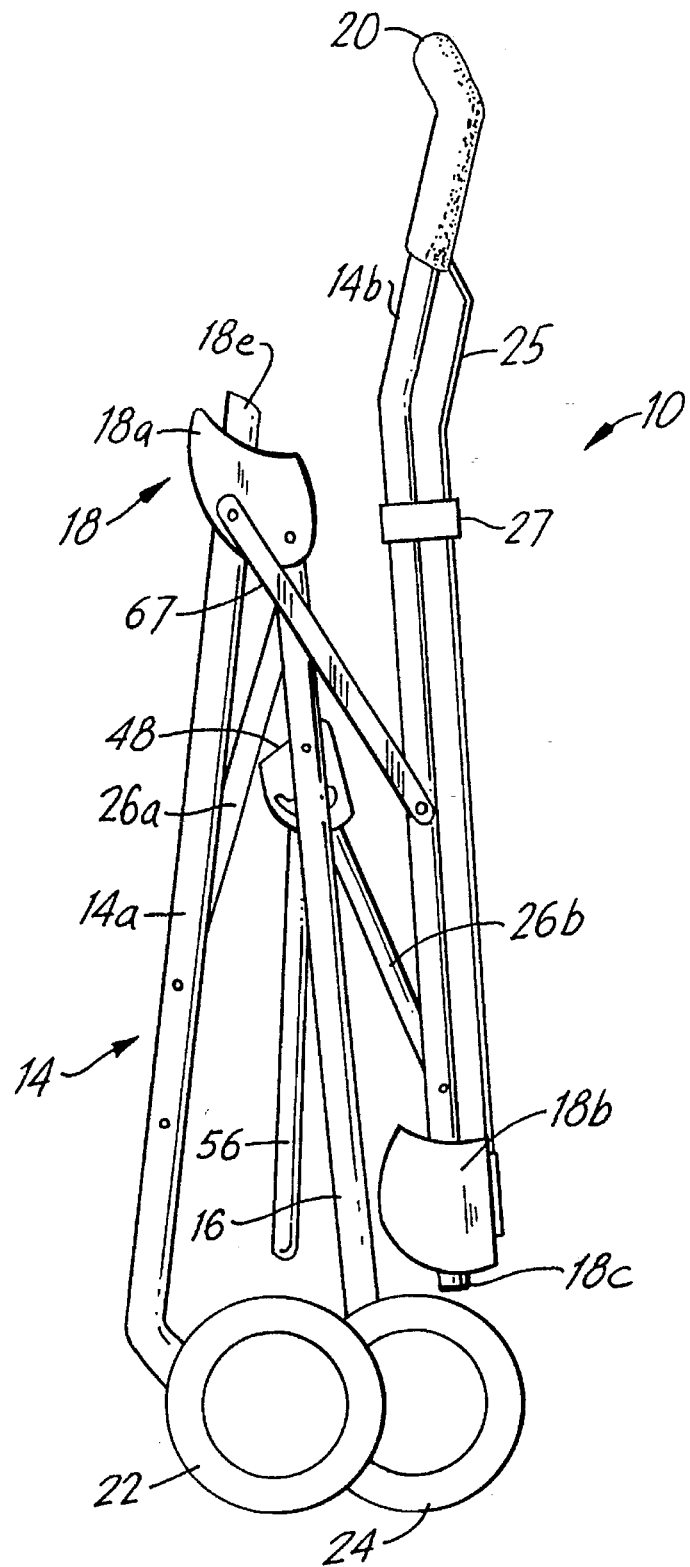
FIG. 5 is a perspective view of the frame of FIG. 2 in its fully closed configuration, viewed from a side thereof.

Thus, locking pivot assembly 18 locks lower tube portion 14a in a parallel, slightly offset relation to upper tube portion 14b, and thereby locks stroller 10 in the open configuration shown in FIG. 2, while providing release thereof to allow upper tube portion 14b to pivot rearwardly with respect to lower tube portion 14a, and thereby fold stroller 10 as shown in FIGS. 3–5 such that handle 20 folds rearwardly over rear wheels 24 of stroller 10. In this regard, to unlock and fold stroller 10, an inverted U-shaped release rod 25 is slidably connected at its upper end to upper ends of upper tube portions 14b by means of slide brackets 27 secured to upper tube portions 14b. The lower free ends of release rod 25 are connected to respective upper locking members 18b. Thus, it is only necessary to pull up on release rod 25, which results in upper locking members 18b sliding upwardly along upper tube portions 14b and thereby releasing bosses 18c from openings 18d of lower locking members 18a.

Each frame half 12a and 12b includes two bars or rods 26a and 26b pivotally connected between lower tube portion 14a, upper tube portion 14b and rear side tube 16. Specifically, rod 26a is pivotally connected at one end to a mid-point of lower tube portion 14a, while rod 26b is a bent rod that is pivotally connected at its upper end to a lower portion of upper tube portion 14b immediately above upper locking member 18b, and is pivotally connected at its bend to an upper portion of rear side tube 16. The opposite free ends of rods 26a and 26b are pivotally connected together. In the open configuration of stroller 10, rods 26a are generally horizontally oriented, while rods 26b are generally vertically oriented.

In order to connect the two side frame halves 12a and 12b together, the lower ends of rear side tubes 16 are connected together by a cross bar 32. Further, a cross bar 42 is connected between the lower ends of lower tube portions 14a of main side tubes 14. As shown in FIG. 1, a foot rest 43 is supported by cross bar 42. Further, a cross bar 44 is connected between the upper ends of lower tube portions 14a of main side tubes 14. As will be appreciated from the discussion hereinafter, cross bar 44 functions as a seat support.

A seat supporting assembly 46 includes two quadrilateral plates 48, each fixed to an inner side of a respective rod 26b adjacent the bend thereof, and is thereby effectively connected to rear side tube 16. Each plate 48 has a substantially saw tooth shaped opening 50 with three toothed portions 52. As shown best in FIG. 4, a connecting rod 54 is connected across quadrilateral plates 48 and also functions as a seat support. Thus, a rigid seat can be positioned on cross bar 44 and connecting rod 54 so as to be supported thereon.

An inverted U-shaped back support bar 56 is pivotally connected at its free ends to plates 48, with the free end of each leg of back support bar 56 having an elongated slot 58 therein in at least partially overlapping relation to saw tooth shaped opening 50, as best shown in FIG. 4. Back support bar 56 constitutes the seat back support of the seat. A reinforcing cross rod 60 is connected between opposite legs of back support bar 56 at mid-points thereof to provide reinforcement of the seat back support.

In order to change the angular orientation of back support bar 56, a rod 62 extends through elongated slots 58 into saw tooth shaped openings 50. A spring 64 is provided at each side frame 12a and 12b, with one end connected to rod 62 and the opposite end connected to the lower end of each leg of back support bar 56, that is, below elongated slot 58 thereof, as best shown in FIG. 4. Thus, springs 64 function to normally bias the opposite free ends of rod 62 into a toothed portion 52 of the saw tooth shaped opening 50 of a respective quadrilateral plate 48, thereby releasably locking the angular position of back support bar 56 in one of three positions.

In order to change the inclination, that is, to position the free ends of rod 62 into other toothed portions 52, an inverted U-shaped rod 66 has its free ends connected to rod 62, with inverted U-shaped rod 66 extending upwardly therefrom. Therefore, it is only necessary to pull up on inverted U-shaped rod 66, thereby pulling rod 62 upwardly against the force of springs 64, and then pivoting U-shaped rod 66, and thereby rod 62, to a different angular position. Since rod 62 is positioned in elongated slots 58, back support bar 56 also pivots with rod 62 and U-shaped, rod 66.

When U-shaped rod 66 is then released, rod 62 will be pulled down by springs ° 64 into another toothed portion 52 to change and releasably lock the angular orientation of back support bar 56.

In accordance with an important aspect of the present invention, each side frame 12a and 12b includes a double pivot bar 67 pivotally connected at one end to lower locking member 18a and at its upper end to the respective upper tubular portion 14b immediately above upper locking member 18b. This is different from conventional strollers in which the lower ends of upper tube portions 14b are directly pivoted to upper ends of lower tube portions 14a. As will be appreciated from the discussion hereinafter as to the folding operation of stroller 10, because of such double pivot bars 67, stroller 10 folds entirely while in an upright configuration, while providing conventional locking pivot assembly between lower tube portions 14a and upper tube portions 14b.

As shown in FIG. 1, a one-piece fabric seat 68 is provided on seat supporting assembly 46. Fabric seat 68 has a seat back portion 70 and a seat portion 72 formed therewith and at right angles thereto. Seat back portion 70 has an inverted pocket (not shown) at its upper end that slips over inverted U-shaped back support bar 56. Thus, seat back portion 70 hangs down from and is supported by inverted U-shaped back support bar 56. Straps (not shown) are provided at the junction of seat back portion 70 and seat portion 72, and are releasably connected to connecting rod 54. A hard and rigid seat plate (not shown) is retained within the fabric of seat portion 72 and seats on cross bar 44 and connecting rod 54 so as to be supported thereon. In addition, straps 74 can be provided for additionally securing sides of fabric seat 68 to upper tube portions 14a.

In addition, a basket 76 can be formed under the seat by a U-shaped basket supporting bar 78 having its opposite free ends pivotally connected with quadrilateral plates 48. In such case, a cross rod 80 shown only in FIG. 1 is provided between mid-points of lower tube portions 14a, and a fabric material 78 which forms basket 76 is hung from U-shaped basket supporting bar 78 and cross rod 80.

When folding stroller 10 from the open configuration of FIG. 2 to the closed configuration of FIG. 5, inverted U-shaped release rod 25 is pulled up. This results in upper locking members 18b sliding upwardly along upper tube portions 14b and thereby releasing bosses 18c from openings 18d of lower locking members 18a. Because of double pivot bars 67, stroller 10 folds entirely while in an upright configuration, while also providing conventional locking pivot assemblies 18 between lower tube portions 14a and upper tube portions 14b. Thus, upper tubular portions 14b are rotated in the counter-clockwise direction of FIG. 2 to the position of FIG. 3 and then to the position of FIG. 4.

During this rotation, it will be appreciated that front wheels 22 and rear wheels 24 are spread apart so as to provide stability to stroller 10.

Then, with the person's foot on cross bar 32 at the lower ends of rear side tubes 16, handle 20 is pulled back toward the person. This results in front wheels 22 and rear wheels 24 moving toward each other to the closed configuration of FIG. 5.

Thus, it is readily observed that stroller 10 is folded entirely while upright, while also enabling use of conventional locking pivot assemblies 18.

Having described a specific preferred embodiment of the invention with reference to the accompanying drawings, it will be appreciated that the present invention is not limited to that precise embodiment and various changes and modifications can be effected therein by one of ordinary skill in the art without departing from the scope or spirit of the invention as defined by the appended claims.

What is claimed is:

1. A stroller comprising:
   a pair of side frames, each said side frame including:
   a main side tube comprised of:
   an upper tube portion, and
   a lower tube portion,
   a releasable locking pivot assembly for releasably locking the lower end of the upper tube portion to the upper end of the lower tube portion such that said upper tube portion and said lower tube portion are substantially in alignment with each other in an open configuration of said stroller and such that the lower end of the upper tube portion and the upper end of the lower tube portion are disengaged from each other in a configuration other than said open configuration, said releasable locking pivot assembly including:
   a lower locking member fixed to an upper end of a respective said lower tube portion, and
   an upper locking member slidably mounted on a lower end of a respective said upper tube portion;
   a rear side tube pivotally connected at a forward end to said lower locking member, and
   a double pivot bar pivotally connected at one end thereof to a lower end portion of the upper tube portion and at an opposite end thereof to the lower locking member to provide a double pivoting connection therebetween;
   rear wheels connected to lower ends of said rear side tubes;
   front wheels connected to lower ends of said lower tube portions, said front wheels and said rear wheels being in a spaced apart configuration in an open position of said stroller;
   means for connecting together said pair of side frames; and
   each said side frame further includes linkage means for connecting together the lower tube portion, the upper tube portion and the rear side tube of the respective side frame such that during pivoting of said upper tube portion upwardly and forwardly to a position extending substantially parallel to said rear side tube to close said stroller from said open position, said rear wheels and said front wheels remain in said spaced apart configuration prior to pivoting of said lower tube portion to a fully folded position extending substantially parallel to both said upper tube portion and said rear side tube.

2. A stroller according to claim 1, wherein at least one of said lower locking member and said upper locking member includes an opening for receiving said upper tube portion and said lower tube portion, respectively, in order to releasably lock the lower end of the upper tube portion to the upper end of the lower tube portion.

3. A stroller according to claim 1, further comprising rod means fixed to said upper locking members and slidably secured to said upper tube portions for slidably moving said upper locking members in a direction away from said lower locking members.

4. A stroller according to claim 1, wherein each said double pivot bar is pivotally connected at said one end thereof to the lower end of the upper tube portion at a position above said upper locking member.

5. A stroller according to claim 1, wherein the linkage means of each said side frame includes:
   a first rod having first and second ends, with said first end pivotally connected to said lower tube portion, and
   a second rod having first and second ends, with:
   said first end of said second rod pivotally connected to said upper tube portion,
   an intermediate point of said second rod between said first and second ends being pivotally connected to said rear side tube, and
   said second end of said second rod pivotally connected to said second end of said first rod.

6. A stroller according to claim 5, wherein said first rod has a generally horizontal orientation in said open configuration of said stroller and said second rod has a generally vertical orientation in said open configuration of said stroller.

7. A stroller according to claim 1, wherein said means for connecting includes:
   a first cross bar connecting together said lower tubular portions, and
   a second cross bar connecting together said rear side tubes.

8. A stroller according to claim 1, further comprising:
   at least one handle mounted to upper ends of said upper tube portions, and
   wherein said front and rear wheels are adjacent each other in a fully folded configuration of said stroller, and said at least one handle is positioned on an opposite side of said stroller from said front and rear wheels in said fully folded configuration.

9. A stroller according to claim 1, wherein said upper and lower tube portions are parallel to each other and only slightly offset from each other in said open configuration of said stroller.

10. A stroller comprising:
    a pair of side frames, each said side frame including:
    a main side tube comprised of:
    an upper tube portion, and
    a lower tube portion,
    a releasable locking pivot assembly for releasably locking the lower end of the upper tube portion to the upper end of the lower tube portion such that said upper tube portion and said lower tube portion are substantially in alignment with each other in an open configuration of said stroller and such that the lower end of the upper tube portion and the upper end of the lower tube portion are disengaged from each other in a configuration other than said open configuration, said releasable locking pivot assembly including:
    a lower locking member fixed to an upper end of said lower tube portion, and an upper locking member slidably mounted on a lower end of said upper tube portion, rod means fixed to said upper locking member and slidably secured to said upper tube portion for slidably moving said upper locking member in a direction away from said lower locking member, a rear side tube pivotally connected at a forward end to said lower locking member, and a double pivot bar pivotally connected at one end thereof to a lower end portion of the upper tube portion at a position above said upper locking member and at an opposite end thereof to said lower locking member to provide a double pivoting connection therebetween;

means for connecting together said pair of side frames;

rear wheels connected to lower ends of said rear side tubes;

front wheels connected to lower ends of said lower tube portions, said front wheels and said rear wheels being in a spaced apart configuration in an open position of said stroller; and each said side frame further includes linkage means for connecting together the lower tube portion, the upper tube portion and the rear side tube of the respective side frame such that during pivoting of said upper tube portion upwardly and forwardly to a position extending substantially parallel to said rear side tube to close said stroller from said open position, said rear wheels and said front wheels remain in said spaced apart configuration prior to pivoting of said lower tube portion to a fully folded position extending substantially parallel to both said upper tube portion and said rear side tube.

11. A stroller according to claim 10, wherein at least one of said lower locking member and said upper locking member includes an opening for receiving said upper tube portion and said lower tube portion, respectively, in order to releasably lock the lower end of the upper tube portion to the upper end of the lower tube portion.

12. A stroller according to claim 10, wherein the linkage means of each said side frame further includes:

a first rod having first and second ends, with said first end pivotally connected to said lower tube portion, and a second rod having first and second ends, with:
said first end of said second rod pivotally connected to said upper tube portion,
an intermediate point of said second rod between said first and second ends being pivotally connected to said rear side tube, and
said second end of said second rod pivotally connected to said second end of said first rod.

13. A stroller according to claim 12, wherein said first rod has a generally horizontal orientation in said open configuration of said stroller and said second rod has a generally vertical orientation in said open configuration of said stroller.

14. A stroller according to claim 10, wherein said means for connecting includes:

a first cross bar connecting together said lower tube portions, and a second cross bar connecting together said rear side tubes.

15. A stroller according to claim 10, further comprising:

at least one handle mounted to upper ends of said upper tube portions, and wherein said front and rear wheels are adjacent each other in a fully folded configuration of said stroller, and said at least one handle is positioned on an opposite side of said stroller from said front and rear wheels in said fully folded configuration.

16. A stroller according to claim 10, wherein said upper and lower tube portions are parallel to each other and only slightly offset from each other in said open configuration of said stroller.

17. A stroller comprising:

a pair of side frames, each said side frame including:
a main side tube comprised of:
an upper tube portion, and
a lower tube portion, a releasable locking pivot assembly for releasably locking the lower end of the upper tube portion to the upper end of the lower tube portion such that said upper tube portion and said lower tube portion are parallel to each other and only slightly offset from each other in an open configuration of said stroller and such that the lower end of the upper tube portion and the upper end of the lower tube portion are disengaged from each other in a configuration other than said open configuration, said releasable locking pivot assembly including:
a lower locking member fixed to an upper end of said lower tube portion, and
an upper locking member slidably mounted on a lower end of said upper tube portion, a rear side tube pivotally connected at a forward end to said lower locking member, and a double pivot bar pivotally connected at one end thereof to a lower end portion of the upper tube portion at a position above said upper locking member and at an opposite end thereof to said lower locking member to provide a double pivoting connection therebetween;

rear wheels connected to lower ends of said rear side tubes;

front wheels connected to lower ends of said lower tube portions, said front wheels and said rear wheels being in a spaced apart configuration in an open position of said stroller;

each said side frame further including linkage means for connecting together the lower tube portion, the upper tube portion and the rear side tube of the respective side frame such that during pivoting of said upper tube portion upwardly and forwardly to a position extending substantially parallel to said rear side tube to close said stroller from said open position, said rear wheels and said front wheels remain in said spaced apart configuration prior to pivoting of said lower tube portion to a fully folded position extending substantially parallel to both said upper tube portion and said rear side tube, each said linkage means including:

a first rod having first and second ends and a generally horizontal orientation in said open configuration of said stroller, with said first end pivotally connected to said lower tube portion, and a second rod having first and second ends and a generally vertical orientation in said open configuration of said stroller, with:
said first end of said second rod pivotally connected to said upper tube portion,
an intermediate point of said second rod between said first and second ends being pivotally connected to said rear side tube, and
said second end of said second rod pivotally connected to said second end of said first rod; and means for connecting together said pair of side frames, said means for connecting including:

a first cross bar connecting together said lower tube portions, and a second cross bar connecting together said rear side tubes.

18. A stroller according to claim 17, wherein at least one of said lower locking member and said upper locking member includes an opening for receiving said upper tube portion and said lower tube portion, respectively, in order to releasably lock the lower end of the upper tube portion to the upper end of the lower tube portion.

19. A stroller according to claim 17, further comprising:

at least one handle mounted to upper ends of said upper tube portions, and wherein said front and rear wheels are adjacent each other in a fully folded configuration of said stroller, and said at least one handle is positioned on an opposite side of said stroller from said front and rear wheels in said fully folded configuration.

\* \* \* \* \*